(12) United States Patent
Watanabe et al.

(10) Patent No.: US 6,397,628 B1
(45) Date of Patent: Jun. 4, 2002

(54) EXPANSION VALVE AND REFRIGERATING SYSTEM

(75) Inventors: Kazuhiko Watanabe; Masamichi Yano, both of Tokyo (JP)

(73) Assignee: Fujikoki Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/543,706

(22) Filed: Apr. 5, 2000

Related U.S. Application Data

(62) Division of application No. 08/554,718, filed on Nov. 7, 1995, now Pat. No. 6,164,624.

(30) Foreign Application Priority Data

Apr. 7, 1995 (JP) ............................................. 7-082177
Jun. 6, 1995 (JP) ............................................. 7-170625

(51) Int. Cl.$^7$ .......................... G05D 27/00; F25B 41/06
(52) U.S. Cl. ....................... 62/509; 236/92 B; 251/368
(58) Field of Search ...................... 236/92 B; 251/368, 251/360, 363; 62/498, 528, 509

(56) References Cited

U.S. PATENT DOCUMENTS

| 2,250,362 A | * | 7/1941 | Dube ........................ 236/92 B |
| 2,478,040 A | * | 8/1949 | Campbell, Jr. et al. . 251/368 X |
| 3,767,164 A | * | 10/1973 | Robinson ................. 251/368 X |
| 3,863,889 A | * | 2/1975 | Robinson et al. ........... 251/328 |
| 4,834,337 A | * | 5/1989 | Chorkey et al. ........ 251/129.18 |

FOREIGN PATENT DOCUMENTS

GB           2096279       * 10/1982 .................. 251/368

* cited by examiner

*Primary Examiner*—William Wayner
(74) *Attorney, Agent, or Firm*—Rader, Fishman & Grauer, PLLC

(57) ABSTRACT

An expansion valve comprises an orifice 30 formed in a valve body 10 and a valve member 9 fixed to a movable member 18. Movement of a diaphragm 4 is transmitted to an actuating rod 17 via a member 16, and the actuating rod 17 actuated the movable member 18 to control the opening amount of the path between the valve member 9 and the orifice 30. An orifice member 100 affixed to the orifice 30 is made of a material harder than the valve body 10, and free from erosion or other damage by a refrigerant, which will otherwise occur at the valve opening portion.

6 Claims, 9 Drawing Sheets

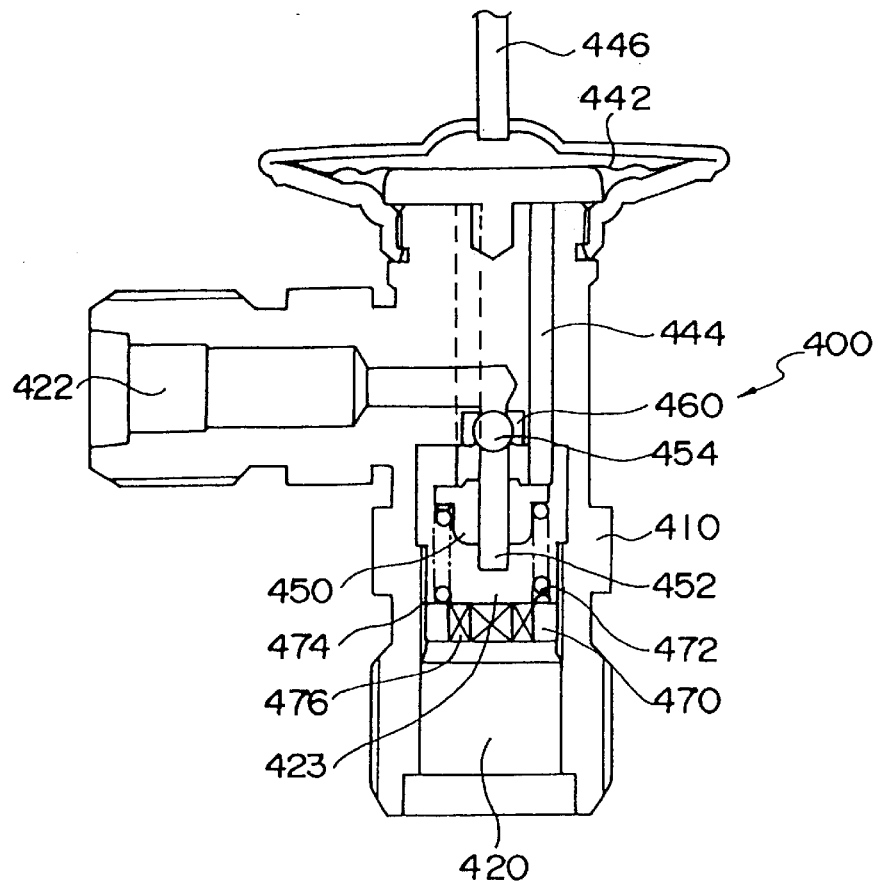
FIG·11
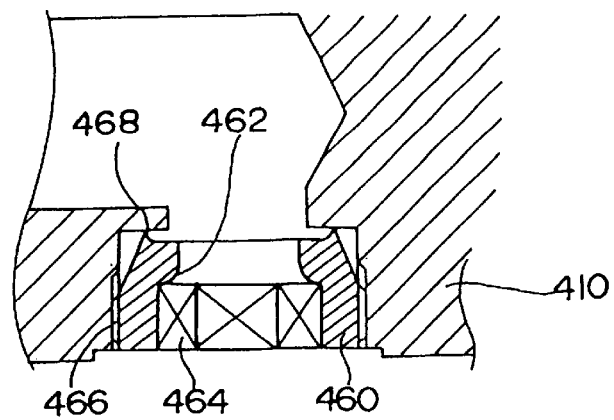
FIG·12

US 6,397,628 B1

EXPANSION VALVE AND REFRIGERATING SYSTEM

This application is a Divisional of application Ser. No. 08/554,718 now U.S. Pat. No. 6,164,624 filed Nov. 7, 1995.

BACKGROUND OF THE INVENTION

1. Field of the Invention

This invention relates to an expansion valve and a refrigerating system for use in an air conditioner of a car, refrigerating display case, or the like.

2. Description of the Prior Art

FIG. 6 shows a cooling cycle of an aid conditioner of a car. The cooling cycle 50 comprises a compressor 51 driven by a travelling engine (not shown) via a clutch, condenser 52 for cooling and condensing a gaseous refrigerant heated and compressed by the compressor 51, liquid tank 53 for separating the refrigerant condensed by the condenser 52 into vapor and liquid and for removing moisture and dust from the refrigerant, expansion valve 54 for expanding the refrigerant from the liquid tank 53, and evaporator 55 for heat-exchange between air and the refrigerant to cool the air to be blown into the compartment, which all are connected by a pipe network.

Typically used as the expansion valve 54 in the refrigerating cycle is one of an internal pressure-equalizing type disclosed by Japanese Patent Laid-Open Publication Sho 51-86852, which includes a pressurizing chamber and a pressure-equalizing chamber which are separated into upper and lower divisions by a diaphragm, the pressure-equalizing chamber being communicated with the inner space of the main body through a pressure-equalizing path.

R11 ($CCl_3F$), R12 ($CCl_2F_2$) and other conventional flon-group materials had been used as refrigerants for cooling or refrigerating systems of the type referred to above. However, these materials in which all hydrogen atoms of hydrocarbon radicals have been replaced by chlorine-containing halogen are subject to a worldwide restraint to stop the destruction of the ozone layer in the stratosphere. To provide alternate flon-group refrigerants that will not destruct the ozone layer, hydrogen-containing halogenated hydrocarbon refrigerants, such as R22 ($CHClF_2$), R123 ($CF_3CHCl_2$), R111b ($CCl_2FCH_3$), R131a ($CF_3CH_2F$), and R152a ($COOF_2CH_3$), have been developed. Among them, non-chlorinated halogenated hydrocarbon, such as R134a ($CF_3CH_2F$) and R152a ($CHF_2CH_3$), are considered hopeful.

Non-chlorinated halogenated hydrocarbon, however, is inferior to conventional flon-group refrigerants in respect of lubricity, and often causes metallic powder to mix in the refrigerant.

Since the expansion valve, among various elements of a refrigerating cycle, comprises a valve member opening and shutting an orifice, the valve seat of the orifice is subject to local abrasion or a sort of corrosion called erosion by metallic powder or other particles contained in the refrigerant.

Japanese Patent Laid-Open Publication Hei 5-346276 discloses a construction in which a guide member made of SUS is slidably disposed in an orifice portion of a valve body made of brass to guide an actuating rod for operating the valve.

OBJECT OF THE INVENTION

It is therefore an object of the invention to provide an expansion valve and a refrigerating cycle free from the drawbacks discussed above.

SUMMARY OF THE INVENTION

According to the invention, there is provided an expansion valve comprising a cylindrical orifice member which is made of a metallic material having a larger hardness than a valve body and is fixed at a valve opening to behave as a valve seat for contact with a valve member.

A tip end of the valve member moves into and away from contact with the valve seat at the valve opening to shut and open the valve. The valve seat made of the hard material is protected against corrosion such as erosion.

BRIEF DESCRIPTION OF THE DRAWINGS

FIG. 11 is a cross-sectional view of an expansion valve according to a further embodiment of the invention;

FIG. 12 is a fragmentary view showing a part of the structure of FIG. 11 in an enlarged scale.

DETAILED DESCRIPTION OF THE PREFERRED EMBODIMENTS

Explained below some embodiments of the invention with reference to the drawings.

Figure 1:
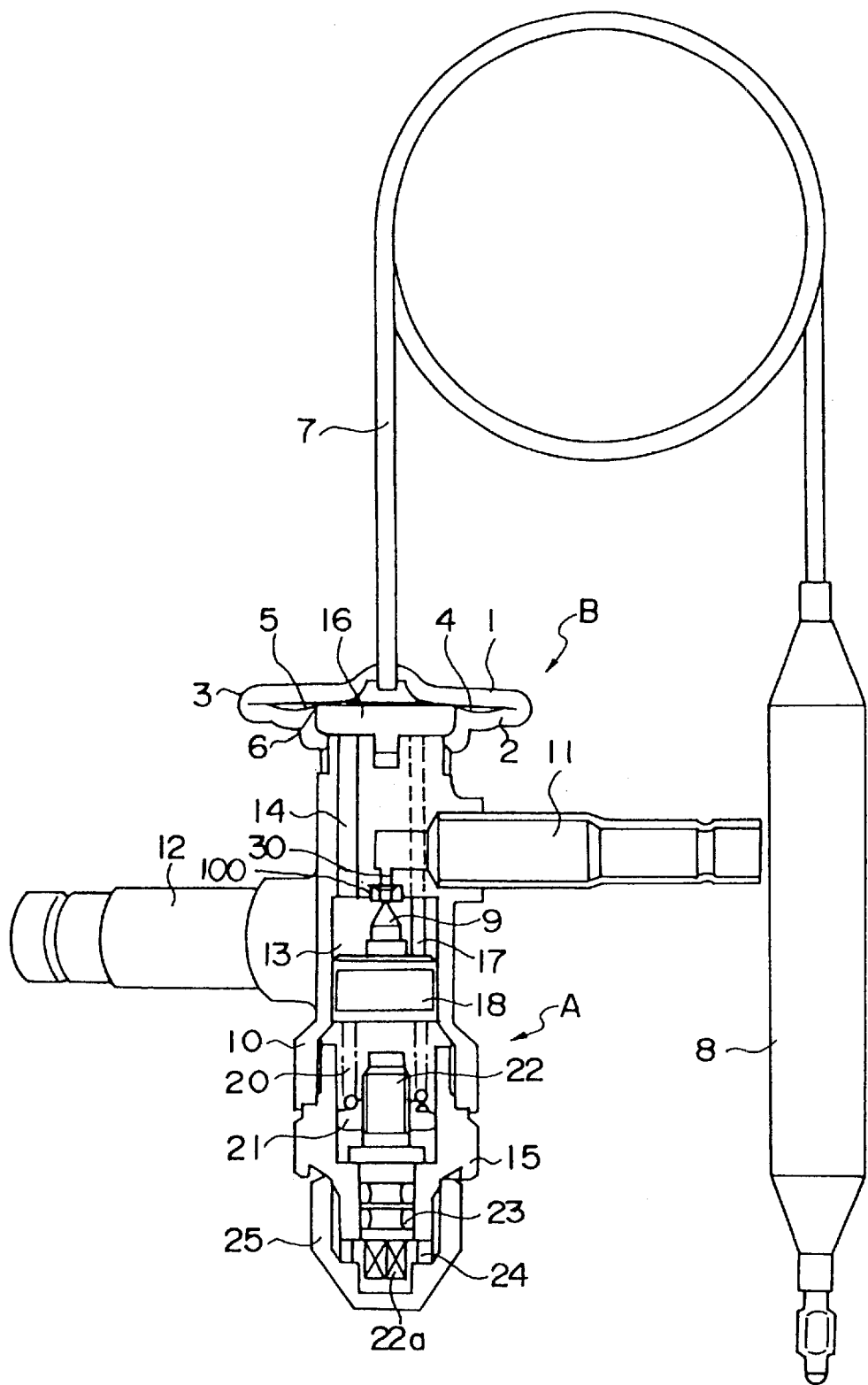
FIG. 1 is a longitudinal cross-sectional view of the entire structure of an internal pressure-equalizing expansion valve according to the invention.

An internal pressure-equalizing expansion valve shown in FIG. 1 comprises a valve portion A for decreasing the pressure of a highly pressurized liquid refrigerant, and a power element portion B which is a driving portion for controlling the opening rate of the valve portion A.

The power element portion B includes a power element outer shell 3 comprising an upper cover portion 1 and a lower support portion 2 (diaphragm receiver), and a diaphragm 4 sandwiched and welded between outer circumferential edges of the upper cover portion 1 and the lower support portion 2. The diaphragm 4 divide an interior space in the power element outer shell 3 into upper and lower chambers, namely, a pressurizing chamber 5 and a pressure-equalizing chamber 6, and the pressurizing chamber 5 communicates with the interior of a heat-sensitive cylinder 8 through a conduit 7.

The heat-sensitive cylinder 8 is provided at an exit portion of an evaporator (not shown) to detect the temperature of the refrigerant near the exit of the evaporator, then convert the temperature into a pressure and recognize it as the pressure of the power element space (pressurizing chamber 5). The pressure, when increased, behaves as the force for pressing the diaphragm 4 downwardly and moving the valve member 9 in its opening direction.

The valve portion A comprises a valve body 10 made of brass and having an inlet 11 for introducing a refrigerant of a high pressure, an outlet 12 for letting out the refrigerant of a low pressure, a valve opening 30 and a valve chamber 13 communicating the inlet 11 with the outlet 12. Formed in the valve body 10 as an outer shell is a pressure-equalizing path 14 for communicating the valve chamber 13 with the pressure-equalizing chamber 6.

The valve body 10 includes a hitching member 15 which is attached to the lower threaded end by screw engagement. Assembled to and in the valve body 10 are a movement regulating member 16 which cooperates with the diaphragm 4 to regulate downward movements of the diaphragm 4; actuating rods 17 for transmitting the displacement of the diaphragm 4 to the lower mechanism (although only one actuating rod is illustrated, three are provided at predetermined intervals in the circumferential direction of a valve mover 18 to move vertically in three vertical holes formed in the valve body 10); a valve member 9 brought into contact with or away from a valve seat 19 formed at the aperture of the orifice 30 (illustrated in the form of a needle valve supported on the valve mover 18); a biasing spring 20 which energizes the valve member 9 upwardly (toward the valve seat 19); and a adjusting member 21 for adjusting the biasing force of the spring 20.

The adjusting member 21 is a polygonal nut, e.g. a hexagon nut, which is slidably received in the inner polygonal hole of the hitching member 15 and engages with an adjusting bolt 22 by screw engagement to move up and down in response to a rotation of the adjusting bolt 22. The adjusting bolt 22 has a polygonal lower end 22*a* to be rotated for adjustment, and rotatably received in the hitching member 15 through the seal of an O-ring 23 such that the lower end 22*a* projects downwardly from the lower end of the hitching member 15.

The hitching member 15 has a threaded open end with which a protective cap 25 having a seal packing 24 on its inner circumferential surface is removably attached such that an operator can rotate the adjusting bolt 22 by removing the protective cap 25.

The present invention particularly uses an orifice member 100 secured in the orifice 30 of the expansion valve constructed as explained above.

Figure 2:
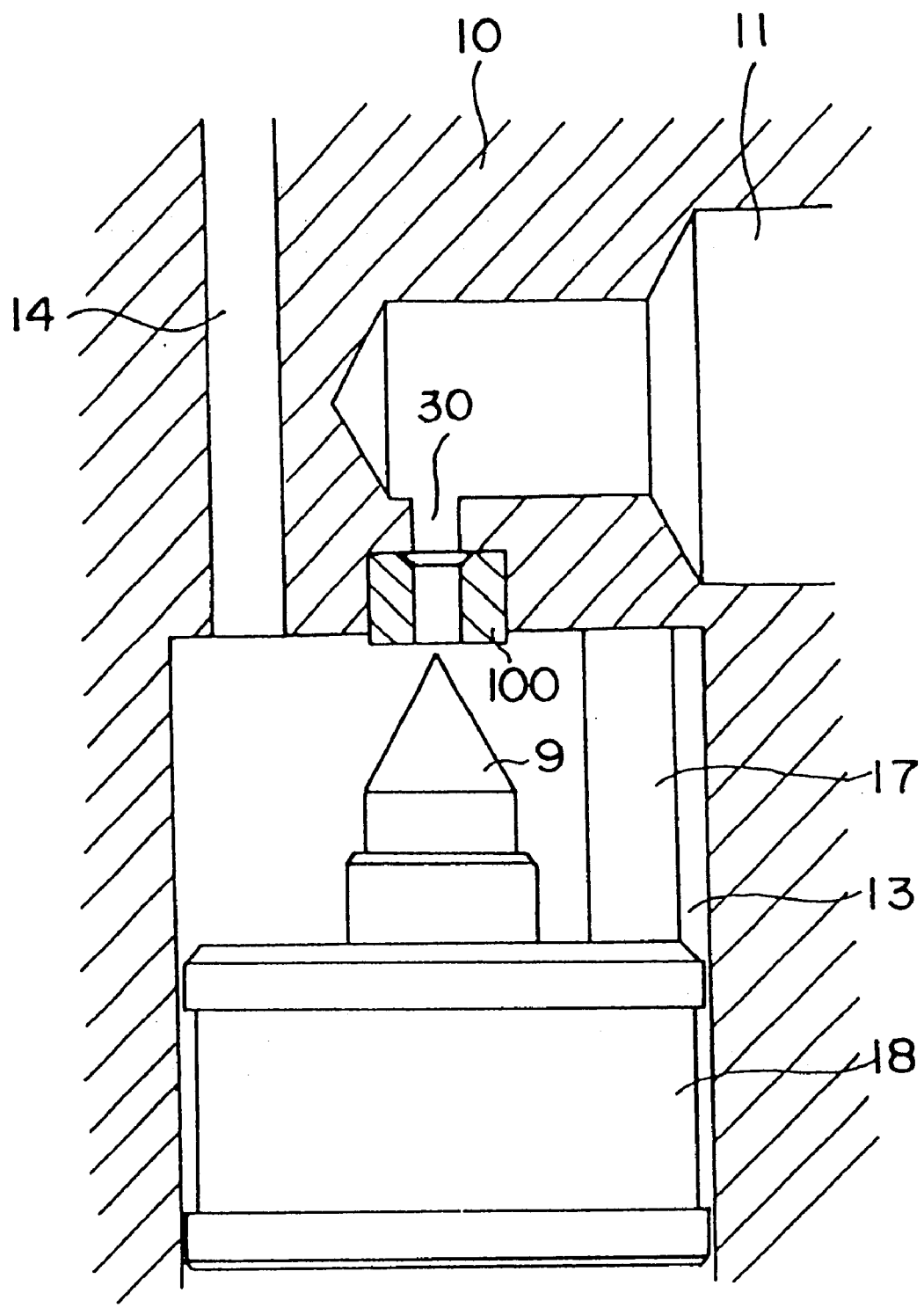
FIG. 2 is a fragmentary cross-sectional view showing a an orifice member and surrounding members according to a first embodiment of the invention in an enlarged scale.

FIG. 2 shows the orifice member 100 secured in the orifice 30. The orifice member 100 is made of a metallic material harder than the material of the valve body 10. More specifically, if the valve body 10 is made of brass, then the orifice member 100 is made of stainless steel. The valve member 9 is also made of stainless steel.

Figure 3:
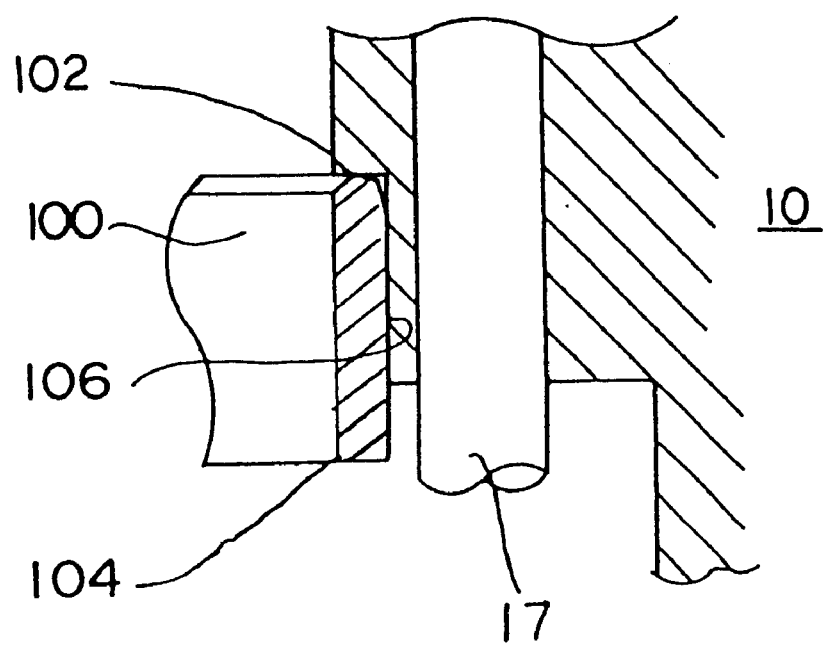
FIG. 3 is a fragmentary cross-sectional view showing a part of the orifice member according to the first embodiment of the invention.

FIG. 3 shows an embodiment in which the orifice member 100 is secured to the valve body 10 by press fit.

The orifice member 100 is cylindrical and the diameter of its outer circumferential surface 106 is slightly larger than the inner diameter of the hole formed in the valve body 10 to receive the orifice member 100.

As stated above, the valve body 10 is made of brass, for example, and the orifice member 100 is made of stainless steel. Therefore, by press fitting the orifice member 100 having a higher hardness in the valve body 10 having a lower hardness, the orifice member 100 can be held reliably in position of the valve body 10. By making a tapered projection 102 at or near the leading end of the orifice member 100 in the press-fitting direction, more reliable joining is ensured.

Since the valve opening (valve seat) 104 of the orifice member 100 for direct contact with the valve member is of stainless steel, it is free from corrosion due to erosion.

Figure 4:
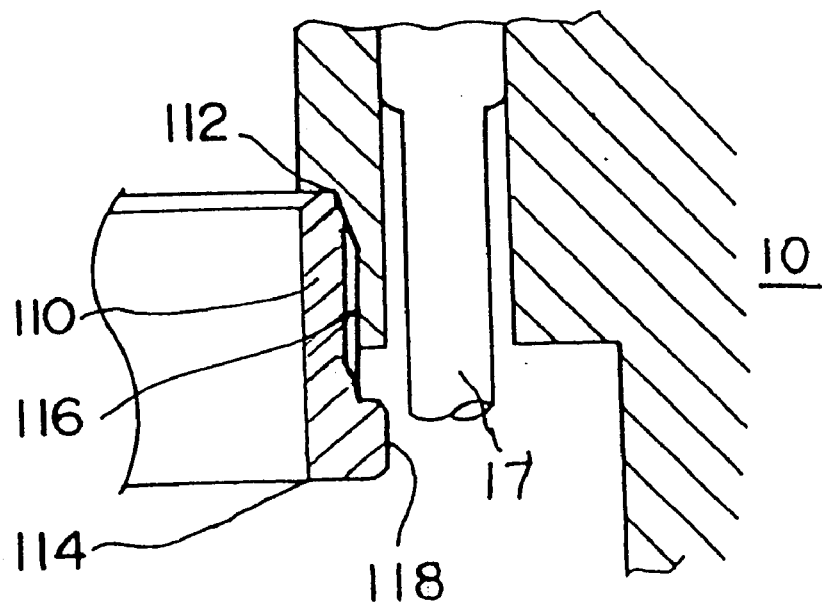
FIG. 4 is a fragmentary cross-sectional view of a part of an orifice member according to a second embodiment of the invention.

FIG. 4 shows a further embodiment of the invention.

This embodiment uses an orifice member 110 having a threaded outer circumferential surface 116. The orifice member 110 is fixed to the valve body 10 by screw engagement between the threaded outer surface 116 and a threaded portion formed in the valve body 10. Here again, the orifice member 110 has a tapered projection 112 near its leading end for more reliable joining. To facilitate the screw engagement, the orifice member 110 has a hexagon nut surface 118 on its outer circumference.

Also in this embodiment, since the orifice member 110 is made of stainless steel, its valve opening 114 is free from damage by erosion.

Figure 5:
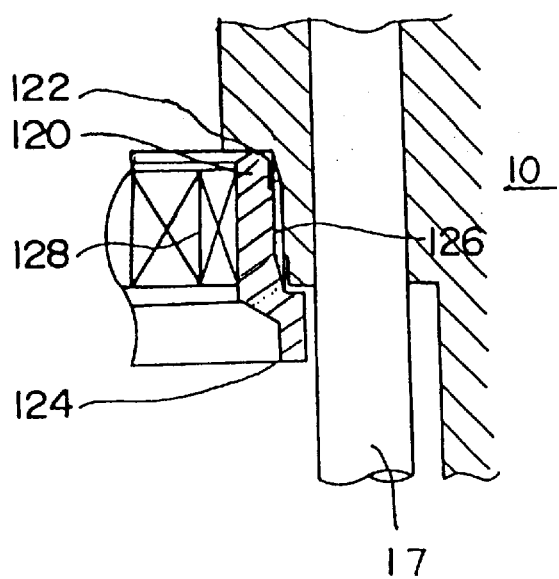
FIG. 5 is a fragmentary cross-sectional view of an orifice member according to a third embodiment of the invention.
Figure 6:
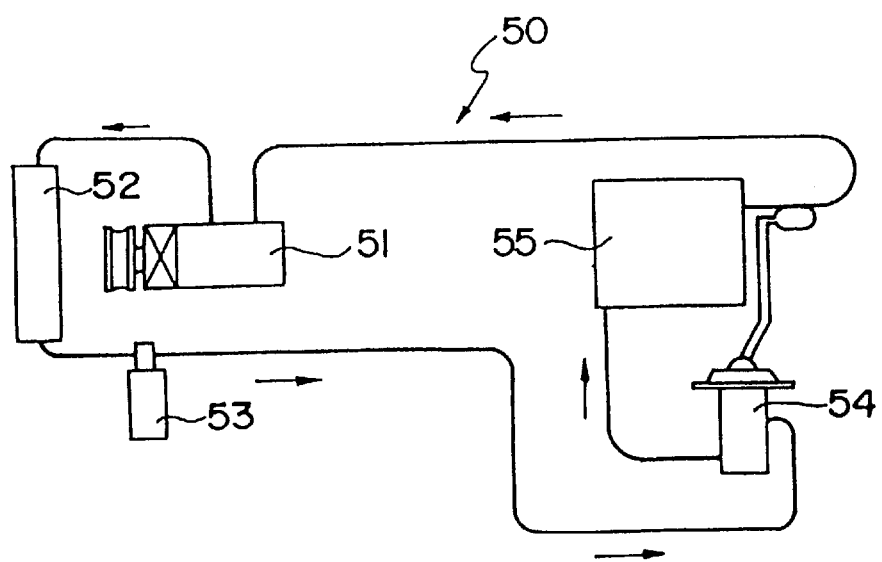
FIG. 6 is a schematic view showing the entire arrangement of a refrigerating system.

FIG. 5 shows a still further embodiment of the invention.

The orifice member 120 used in this embodiment has a threaded outer circumferential surface 126 and a hexagonal bore 128 for engagement with a hexagon wrench. By inserting a hexagon wrench in the hexagonal bore 128 of the orifice member 120, the orifice member 120 is affixed through screw engagement with the threaded portion of the valve body 10. Here again, the orifice member 120 has a tapered projection near its leading end for more reliable joining.

Since the orifice member 120 is made of stainless steel, its valve opening 124 is free from damage by erosion.

Figure 7:
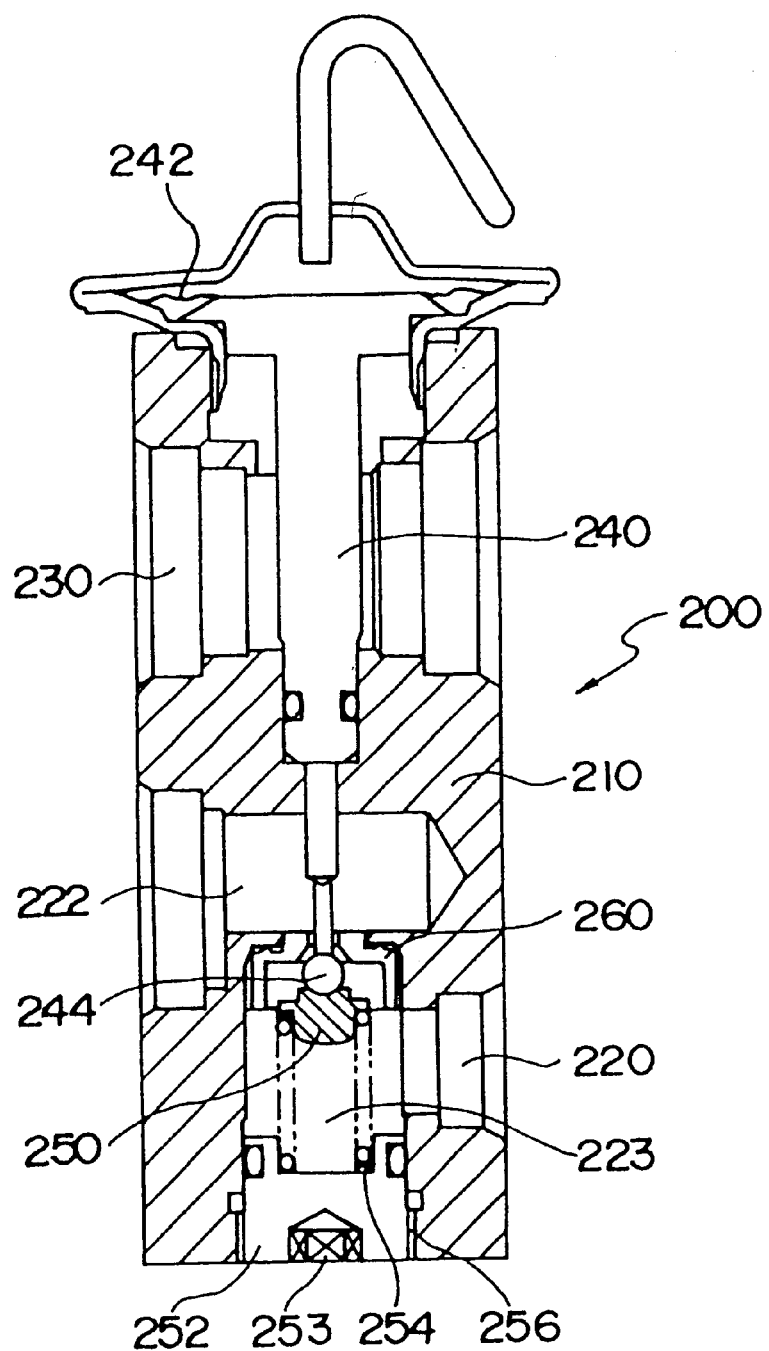
FIG. 7 is a cross-sectional view of an expansion valve according to a further embodiment of the invention.
Figure 8:
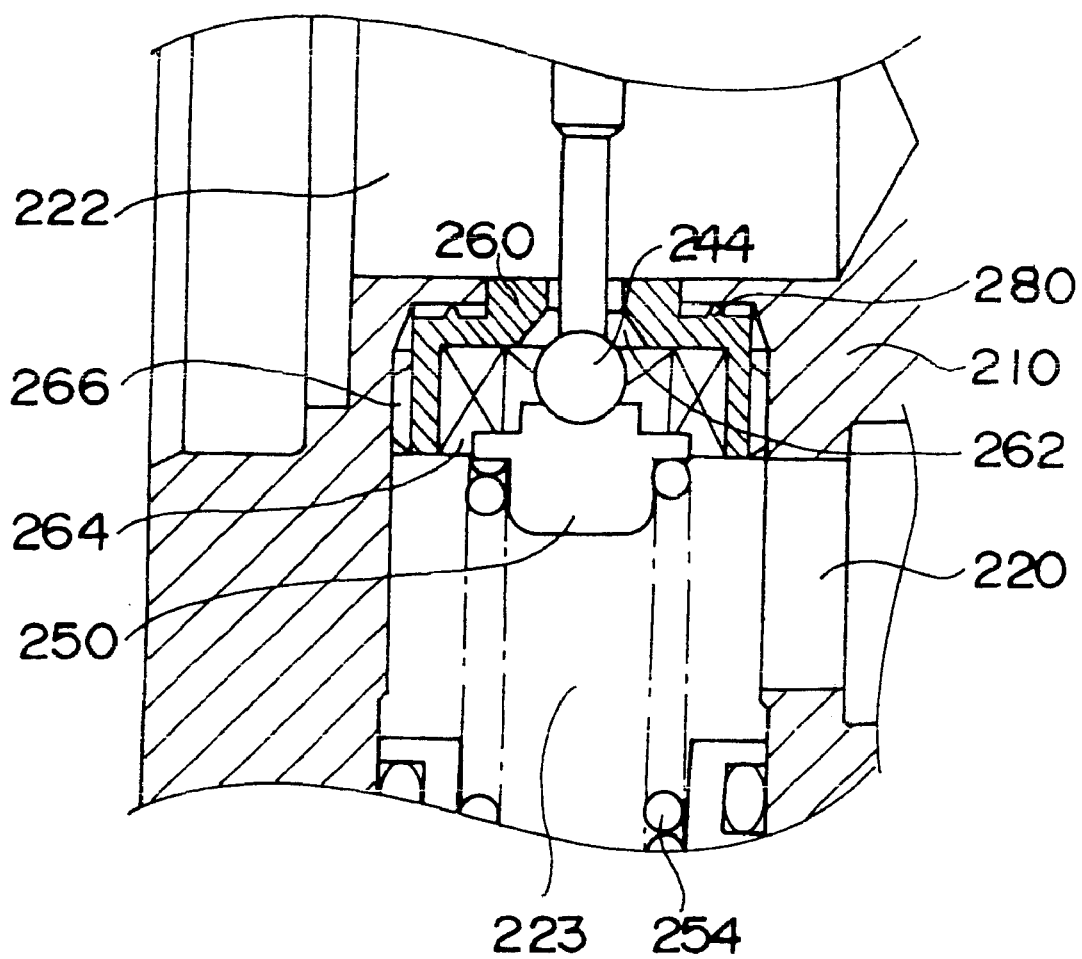
FIG. 8 is a fragmentary view showing a part of the structure of FIG. 7 in an enlarged scale.

FIG. 7 is a cross-sectional view showing a further embodiment of the expansion valve according to the invention, and FIG. 8 shows part of FIG. 7 in an enlarged scale.

The expansion valve 200 has an inlet port 220, an outlet port 222, and a valve chamber 223 adjacent the inlet port 220, which are formed in the valve body 210. Affixed in the valve chamber 233 is an orifice member 260.

A liquid refrigerant is supplied to the inlet port 220, travels through the orifice member 260 while expanding its volume, and is sent to the evaporator (not shown here and in the successive drawings) through the outlet port 222. The refrigerant exiting from the evaporator is introduced into a path 230 formed in the valve body 210. Exposed in the path 230 is a heat-sensitive stem 240 whose upper end is connected to a diaphragm 242.

The lower end of the stem 240 extends through and beyond the orifice of the orifice member 260, and a valve member 244 is fixed to the lower end. The valve member 244 is spherical and supported on a support member 250.

The support member 250 is held on a cap 252 via a spring 254. The cap 252 engages with a threaded portion 256 of the valve body 210 such that the depth of the screw engagement can be changed to adjust the force of the spring 254. The cap 252 has a hexagonal bore 253 for engagement with a wrench for such adjustment.

The orifice member 260 is affixed to the valve body 210 by screw engagement through a threaded portion 266 formed on its outer circumference. The orifice member 260 has a valve seat 262 and a hollow hexagonal bore 264. By using a wrench inserted in the hexagonal bore 264, the orifice member 260 is joined to the valve body 210. The orifice member 260 has a projection 280 to bite into the valve body 210 for reliable joining.

By making the valve body 210 of brass and the orifice member 260 of stainless steel or other like material, the corrosion resistance of the orifice portion can be improved.

Figure 9:
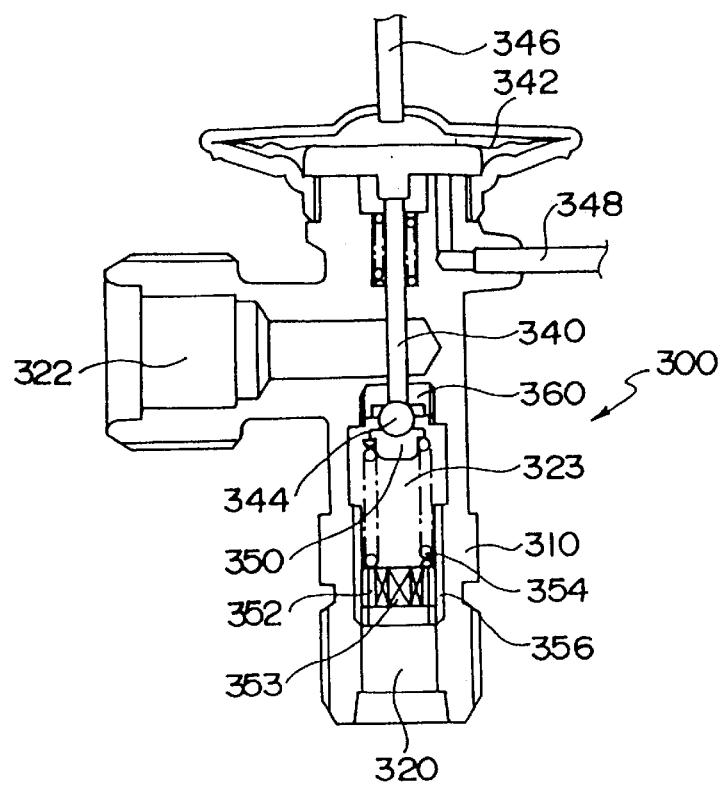
FIG. 9 is a cross-sectional view of an expansion valve according to a further embodiment of the invention.
Figure 10:
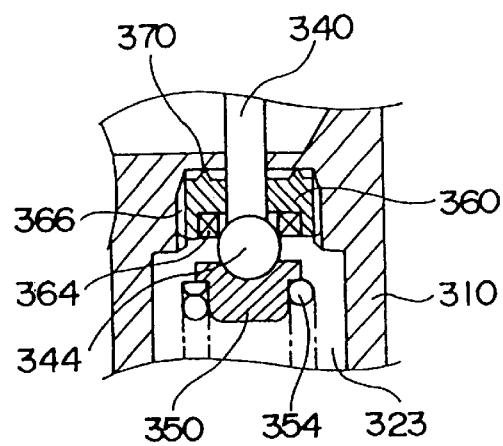
FIG. 10 is a fragmentary view showing a part of the structure of FIG. 9 in an enlarged scale.

FIG. 9 is a cross-sectional view showing a further embodiment of the expansion valve according to the invention, and FIG. 10 shows part of FIG. 9 in an enlarged scale.

The expansion valve 300 has a inlet port 320, outlet port 322, and valve chamber 323 adjacent the inlet port, which are formed in the valve body 310. Affixed in the valve chamber 323 is an orifice member 360.

A liquid refrigerant is supplied to the inlet port 320, then travels through the orifice member 360 while expanding its volume, and is sent to the evaporator through the outlet port 322. The evaporator contains a so-called heat-sensitive cylinder (not shown), and supplies a gas pressure onto a diaphragm 342 through a capillary 346. The gas pressure of the refrigerant at the outlet of the evaporator is supplied to the lower side of the diaphragm 342 through a pipe 348. A stem 340 connected to the diaphragm 342 has a lower end extending through and beyond the orifice of the orifice member 360, and a valve member 344 is fixed to the lower end of the stem 340. The valve member 344 is spherical and supported on a support member 350.

The support member 350 is held on a cap 352 via a spring 354. The cap 352 is mounted to the valve body 310 by engagement with a threaded portion 356 of the valve body 310 such that the depth of the screw engagement of the cap 352 can be changed to adjust the force of the spring 354. The cap 352 has a hexagonal bore 353 for receiving a wrench for such adjustment.

The orifice member 360 is joined to the valve body 310 by screw engagement of a threaded portion 366 on its outer circumference. The orifice member 360 has a valve seat and a hollow hexagonal bore 364. By using a wrench inserted in the hexagonal bore 364, the orifice member 360 is joined to the valve body 310. The orifice member 360 has a projection 370 near its leading end to bite into the valve body 310 for reliable joining.

By making the valve body 310 of brass and the orifice member 360 of stainless steel or other like material, the corrosion resistance of the orifice portion can be improved.

FIG. 11 is a cross-sectional view showing a further embodiment of the expansion valve according to the invention, and FIG. 12 shows part of FIG. 2 in an enlarged scale.

The expansion valve 400 has an inlet port 420, outlet port 422, and valve chamber 423 adjacent the inlet port 420, which are formed in a valve body 410. Affixed in the valve chamber 423 is an orifice member 460.

A liquid refrigerant is supplied to the inlet port 420, then travels through the orifice member 460 while expanding its volume, and is sent to the evaporator through the outlet port 422. The evaporator contains a so-called heat-sensitive cylinder (not shown), and supplies a gas pressure onto the diaphragm 442 via the capillary 446. The diaphragm 442 moves a valve support member 450 through a actuating rod 444.

A stem 452 attached to the support member 450 brings the spherical valve member 454 in its opening and closing directions.

The support member 450 is held on a cap 470 via a spring 472. The cap 470 is mounted to the valve body 410 by screw engagement with a threaded portion 474 of the valve body 410, such that the depth of the screw engagement of the cap 470 can be changed to adjust the force of the spring 472. The cap 470 has a hexagonal bore 476 for receiving a wrench for such adjustment.

The orifice member 460 is joined to the valve body 410 by screw engagement through a threaded portion 466 on its outer circumference. The orifice member 460 has a valve seat 462 and a hollow hexagonal bore 464. By using a wrench inserted in the hexagonal bore 464, the orifice member 460 is joined to the valve body 410. The orifice member 460 has a projection 468 near its leading end to bite into the valve body 410 for reliable joining.

By making the valve body 410 of brass and the orifice member 460 of stainless steel or other like material, the corrosion resistance of the orifice portion can be improved.

Figure 13:
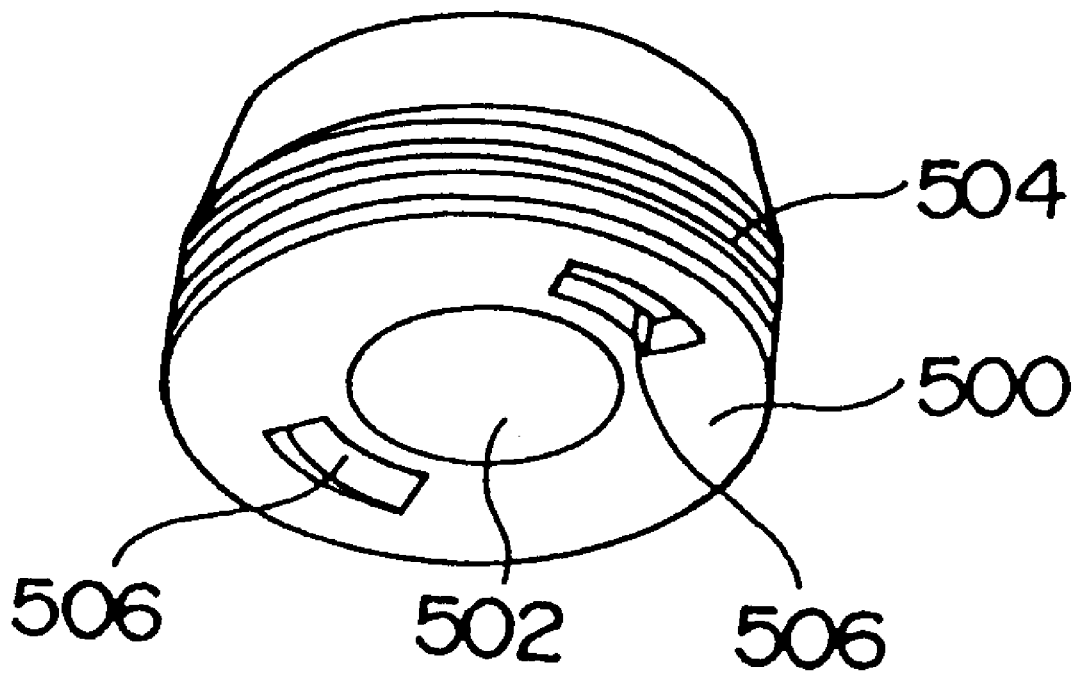
FIG. 13 is a perspective view of an orifice member according to a further embodiment of the invention.

FIG. 13 shows a further embodiment of the orifice member used in the present invention.

The orifice member 500 has a round orifice bore 502 in its center and a threaded portion 504 on its outer circumference. The orifice member 500 has arcuate recesses 506 along its end surface to insert a tool in the recesses 506 and use it for joining the orifice member to the valve body.

The means for engagement with a tool may be selected from various configurations other than the arcuate recesses.

Although some embodiments has been explained as using stainless steel as the hard metallic material for the orifice member, the invention envisages the use of any metallic material having a Vickers hardness ranging from 150 to 500, such as aluminum bronze, nickel bronze, Stellite 6 (trademark), Stellite 6B (trademark), high-strength brass alloys (for example, HB91, a kind of metals called Hero Bronze marketed by Nippon Shindo Corporation), or the like. It is also possible to improve the hardness of the valve opening by plating or surface-treating the valve opening portion of the valve body.

By incorporating any one of expansion valves described above in a refrigerating system, the life of the refrigerating can be elongated even when using an alternate flon-group refrigerant.

It should also be noted that, in a so-called electric expansion valve, its valve opening can be made of a metallic material having a high corrosion resistance against a refrigerant comprising hydrogenous halogenated hydrocarbon.

As described above, as a countermeasure against rotting caused by erosion at the valve opening because the valve body of an expansion valve used in a refrigerating system is made of brass or other like material, considering the nature of a refrigerant used, the present invention makes the valve opening of a hard material to prevent erosion. More specifically, the hardness of the valve opening can be increased by local surface treatment, etc. Alternatively, by making an orifice member of a hard material, the life of the expansion valve can be increased.

By using such an expansion valve, a long-life refrigerating system using an alternate flon can be provided.

What is claimed is:

1. A method of preventing erosion caused by a non-chlorinated halogenated hydrocarbon refrigerant in an expansion valve of a refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condensers liquid tank, expansion valve and evaporator; and a driving portion for controlling the opening rate of the expansion valve;

wherein said expansion valve comprises a valve member and an orifice, said orifice providing an opening between an inlet path for introducing the refrigerant at a high pressure and an outlet path for expelling the refrigerant at a low pressure;

said method comprising preventing erosion caused by said non-chlorinated halogenated hydrocarbon refrigerant in said expansion valve of said refrigerating system by forming said orifice of said expansion valve from a metallic material having a Vickers hardness ranging from 150 to 500, wherein said metallic material is corrosion-resistant to said non-chlorinated halogenated hydrocarbon refrigerant; and forming a valve body of said expansion valve, in which said orifice is secured, of a material less hard than said metallic material from which said orifice is formed.

2. A method of preventing erosion caused by a non-chlorinated halogenated hydrocarbon refrigerant in an expansion valve of a refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condenser, liquid tank, expansion valve and evaporator; and a driving portion for controlling the opening rate of the expansion valve;

wherein said expansion valve comprises a valve member and an orifice, said orifice providing an opening between an inlet path for introducing the refrigerant at a high pressure and an outlet path for expelling the refrigerant at a low pressure, where said orifice is secured within said expansion valve by press fit;

said method comprising preventing erosion caused by said non-chlorinated halogenated hydrocarbon refrigerant in said expansion valve of said refrigerating system by forming said orifice of said expansion valve from a metallic material having a Vickers hardness ranging from 150 to 500, wherein said metallic material is corrosion-resistant to said non-chlorinated halogenated hydrocarbon refrigerant; and forming said orifice with a tapered projection for facilitating said press fit.

3. A method of preventing erosion caused by a non-chlorinated halogenated hydrocarbon refrigerant in an expansion valve of a refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condenser, liquid tank, expansion valve and evaporator; and a driving portion for controlling the opening rate of the expansion valve;

wherein said expansion valve comprises a valve member and an orifice, said orifice providing an opening between an inlet path for introducing the refrigerant at a high pressure and an outlet path for expelling the refrigerant at a low pressure, where said orifice is secured within said expansion valve by threaded engagement with valve body of said expansion valve;

said method comprising preventing erosion caused by said non-chlorinated halogenated hydrocarbon refrigerant in said expansion valve of said refrigerating system by forming said orifice of said expansion valve from a metallic material having a Vickers hardness ranging from 150 to 500, wherein said metallic material is corrosion-resistant to said non-chlorinated halogenated hydrocarbon refrigerant; and forming said orifice with a tapered projection for facilitating said threaded engagement.

4. A method of reducing accumulation of metallic particulate matter in a non-chlorinated halogenated hydrocarbon refrigerant of a refrigerating system caused by erosion of a valve seat in an expansion valve of said refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condenser, liquid tank, expansion valve and evaporator; and a driving portion for controlling the opening rate of the expansion valve;

wherein said expansion valve comprises a valve member that selectively seals an opening through said valve seat, said opening being between an inlet path for introducing the refrigerant at a high pressure and an outlet path for expelling the refrigerant at a low pressure;

said method comprising reducing said accumulation of metallic particulate matter in said non-chlorinated halogenated hydrocarbon refrigerant of said refrigerating system caused by erosion of said valve seat in said expansion valve by preventing erosion of said seat valve caused by said non-chlorinated halogenated hydrocarbon refrigerant, said reducing said accumulation of metallic particulate matter being performed by forming said valve seat of said expansion valve from a metallic material having a Vickers hardness ranging from 150 to 500, wherein said metallic material is corrosion-resistant to said non-chlorinated halogenated hydrocarbon refrigerant; and forming a valve body of said expansion valve, in which said valve seat is secured, of a material less hard than said metallic material from which said valve seat is formed.

5. A method of reducing accumulation of metallic particulate matter in a non-chlorinated halogenated hydrocarbon refrigerant of a refrigerating system caused by erosion of a valve seat in an expansion valve of said refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condenser, liquid tank, expansion valve and evaporator; and a driving portion for controlling the opening rate of the expansion valve;

wherein said expansion valve comprises a valve member that selectively seals an opening through said valve seat, said opening being between an inlet path for introducing the refrigerant at a high pressure and an outlet path for expelling the refrigerant at a low pressure; where said valve seat is secured within said expansion valve by press fit;

said method comprising reducing said accumulation of metallic particulate matter in said non-chlorinated halogenated hydrocarbon refrigerant of said refrigerating system caused by erosion of said valve seat in said expansion valve by preventing erosion of said seat valve caused by said non-chlorinated halogenated hydrocarbon refrigerant, said reducing said accumulation of metallic particulate matter being performed by forming said valve seat of said expansion valve from a metallic material having a Vickers hardness ranging from 150 to 500, wherein said metallic material is corrosion-resistant to said non-chlorinated halogenated hydrocarbon refrigerants; and forming said valve seat with a tapered projection for facilitating said press fit.

6. A method of reducing accumulation of metallic particulate matter in a non-chlorinated halogenated hydrocarbon refrigerant of a refrigerating system caused by erosion of a valve seat in an expansion valve of said refrigerating system, wherein said refrigerating system comprises:

said non-chlorinated halogenated hydrocarbon refrigerant;

a compressor for compressing the refrigerant to a high temperature and a high pressure;

a condenser for condensing the compressed refrigerant;

a liquid tank for separating the condensed refrigerant into vapor and liquid and for removing moisture and dust from the refrigerant;

said expansion valve for expanding the refrigerant sent from the liquid tank;

an evaporator for heat exchange between air and the refrigerant from the expansion valve;

a pipe network connecting the compressor, condenser, liquid tank, expansion valve and evaporator; and a driving portion for controlling the opening rate of the expansion valve;

wherein said expansion valve comprises a valve member that selectively seals an opening through said valve seat, said opening being between an inlet path for introducing the refrigerant at a high pressure and an outlet path for expelling the refrigerant at a low pressure; where said valve seat is secured within said expansion valve by threaded engagement;

said method comprising reducing said accumulation of metallic particulate matter in said non-chlorinated halogenated hydrocarbon refrigerant of said refrigerating system caused by erosion of said valve seat in said expansion valve by preventing erosion of said seat valve caused by said non-chlorinated halogenated hydrocarbon refrigerant, said reducing said accumulation of metallic particulate matter being performed by forming said valve seat of said expansion valve from a metallic material having a Vickers hardness ranging from 150 to 500, wherein said metallic material is corrosion-resistant to said non-chlorinated halogenated hydrocarbon refrigerant; and forming said valve seat with a tapered projection for facilitating said threaded engagement.

* * * * *

UNITED STATES PATENT AND TRADEMARK OFFICE
CERTIFICATE OF CORRECTION

PATENT NO.   : 6,397,628 B1                                                                      Page 1 of 1
DATED        : June 4, 2002
INVENTOR(S)  : Watanabe et al.

It is certified that error appears in the above-identified patent and that said Letters Patent is hereby corrected as shown below:

<u>Title page,</u>
Item [30], Foreign Application Priority Data, should read:
-- [30] Foreign Application Priority Data
Apr. 7, 1995   (JP)   7-082177
Jul. 6, 1995   (JP)   7-170625 --

Signed and Sealed this

Twenty-seventh Day of May, 2003

JAMES E. ROGAN
*Director of the United States Patent and Trademark Office*